This invention is related generally to accelerometers, and more particularly to means adapted to integrate forces of acceleration so that a measure of the distance traveled by an accelerated body is indicated by the device.

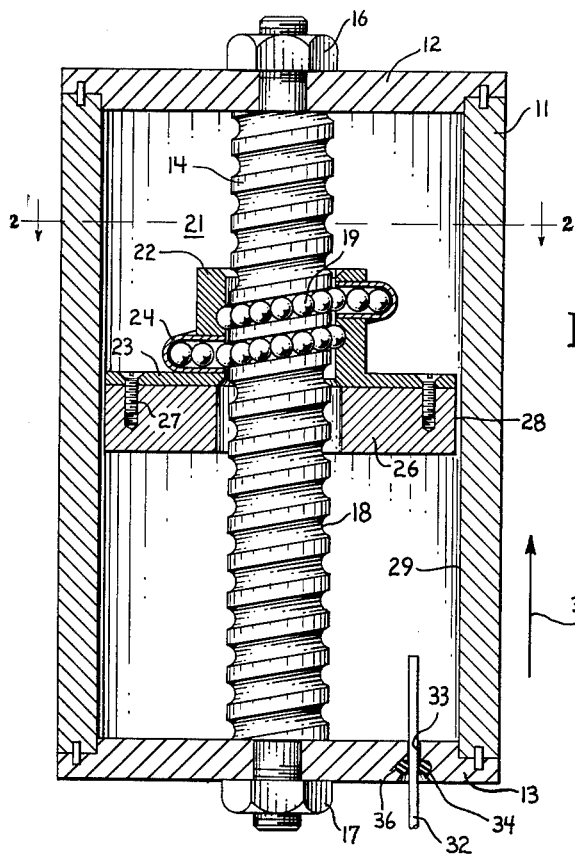
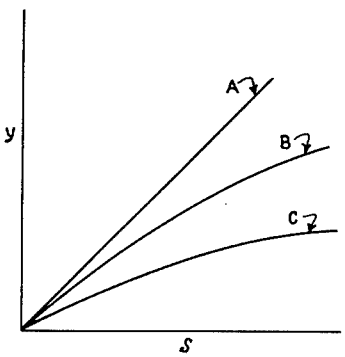
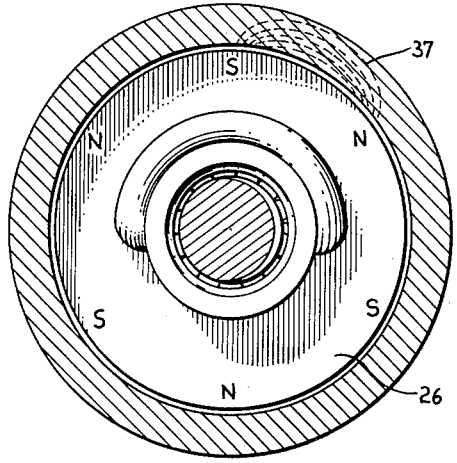
Fig. 1.
Fig. 3.
Fig. 2.
INVENTOR.
RALPH H. SEVERANCE 3,066,540
ACCELERATION MEASURING DEVICE
Ralph H. Severance, Urbana, Ill., assignor to The Magnavox Company, Fort Wayne, Ind., a corporation of Delaware
Filed Sept. 23, 1960, Ser. No. 58,041
12 Claims. (Cl. 73—490)

In work related to rockets and missiles and ordnance generally, it is necessary to perform timing functions and initiate various effects during the course of flight. One means of accomplishing this is to provide an accelerometer located within a rocket or missile itself and capable of automatically initiating events in response to certain conditions of motion or position. Of particular utility in this respect is an accelerometer mounted in a rocket or missile and capable of triggering events in response to travel over a certain distance from the launching or firing site.

It is, therefore, an object of this invention to provide a novel accelerometer adapted to incorporation in rockets, missiles or the like.

It is another object of this invention to provide a means for integration of forces of acceleration to produce a measure of distance traveled by the accelerated body.

This invention includes in its scope a cylinder having affixed thereto a post incorporating a screw thread thereon. A disk is threadedly engaged to the post by means of the screw thread and the disk itself is of a dimension which is such that a portion thereof is in close proximity to the cylindrical housing. Either the disk or the housing may carry magnetic poles disposed so that movement of the disk in rotation about the threaded post and translation therealong is inhibited to some extent by eddy currents developed between the disk and the housing. At the firing of the projectile the disk is positioned toward one end of the housing and advances in response to acceleration of the projectile towards the other end of the housing. Some type of triggering means is employed in the housing so that when the disk engages the triggering means during its advance in the housing, certain events can be caused to take place.

The full nature of the invention will be understood from the accompanying drawings and the following description and claims:

FIG. 1 illustrates a typical embodiment of the present invention.

FIG. 2 is a section of the embodiment of FIG. 1 taken along the line 2—2 of FIG. 1.

FIG. 3 illustrates the relationship between the distance traveled by the accelerometer and the disc present therein for several variations to this invention.

Referring to the embodiment of FIG. 1, there is shown a cylindrical housing 11 having end caps 12 and 13 closing each end thereof. A post 14 is disposed between the end caps 12 and 13 being fastened thereto by the nuts 16 and 17. The post 14 is coaxial with the housing 11.

The post 14 has a continuous groove 18 in its exterior surface extending along the post in a spiral. The groove 18 is of a generally curved section adapted to receive the balls 19 of the recirculating ball nut 21.

The recirculating ball nut has a flanged body portion having the core 22 and a flange 23. The ball nut is shown with one and one-half rows of balls, but may be employed with more or less as desired. The circuit of balls around the shaft is closed by the ball return conduit 24.

A circular disk 26 is fastened to the ball nut flange 23 by means of the screws 27. The disk thereby can be carried freely up and down in the housing 11 with its periphery 28 in closed proximtiy to the regular and usually cylindrical inner surface 29 of the housing 11. The disk 26 normally has a plurality of magnetic poles disposed around its periphery and the housing 11 is normally made of an electrically conducting material so that as the disk moves in rotation about the shaft 14 and in translation along the shaft, eddy currents are developed by the disk in the housing to oppose the motion of the disk.

In the embodiment shown, the disk would normally be positioned as close as possible to the uppermost point in the housing so that as the housing is accelerated in the direction shown by the arrow 31, the disk advances downwardly, its motion being resisted by the eddy currents developed by the disk in the housing.

A shaft 32 is shown mounted in the lower end cap 13 wherein it is guided by the walls of a hole 33 through the end cap. A resilient member 34, which may be an O-ring, for example, is disposed in a groove 36 in the end cap and permits positioning of the shaft 32 in any longitudinal position desired in the housing. This shaft 32 can be associated with any appropriate type of mechanism or circuitry in order to provide the initiation of some desirable event upon actuation of the shaft 32 by the disk 26 as it moves downwardly with respect to the housing 11 in response to an acceleration of the housing 11 in the direction shown by the arrow 31.

FIG. 2, which is a section of the embodiment of FIG. 1 taken along the lines 2—2 of FIG. 1, illustrates a typical disposition of the magnetic poles in the disk 26. The lines 37 represent schematically flux lines linking the housing 11 to the disk 26 by a magnetic field between the magnetic poles of the disk 26.

In FIG. 3 the vertical coordinate represents the distance traveled by the disk with respect to the housing and the horizontal coordinates represent the distance traveled by the housing in space. Curve A represents the relationship between the position of the disk and the distance traveled by the housing for the case where no eddy current loss is employed in the accelerometer. Curve B indicates the effect obtained when an eddy current loss proportional to the square of the angular velocity of the disk is obtained. Curve C indicates the relationship obtained by employing a slightly dicerent shape for the housing.

It should be noted at this point that the invention has been described in an embodiment where the mounting of the disk to the housing is accomplished through a ball nut. Other low friction arrangements can be employed. For example, a more conventional screw thread could be employed on the post 14. The inside diameter of the disk 26 could be provided with a mating screw thread portion. To obtain particularly low friction operation these parts could be treated or specially plated. One example of a satisfactory plating material is Teflon.

The embodiment described also employs magnetic poles. In some instances it is desirable for the accelerometer to respond in direct proportion to the distance it travels and in such instances the magnetic poles are eliminated.

It was mentioned above in this description that the shaft 32 could be positioned to initiate events upon actuation by the disk 26. This actuation is related to the distance in space traveled by the housing inasmuch as the distance traveled by the disk with respect to the housing is a measure of the distance traveled in space by the housing.

This effect is evident from the following mathematical derivations wherein:

$m$ = mass of rotating magnetic disk
$a$ = instantaneous acceleration applied to housing
$y$ = distance traveled by rotating disk inside the housing in time $t$
$s$ = distance traveled by the projectile under acceleration $a$ applied to the housing in time $t$.
$PE$ = Potential energy lost by mass $m$ in time $t$
$KE$ = Kinetic energy gained by the mass $m$ in time $t$
Loss = Energy lost due to eddy currents
$w$ = Angular velocity of disk When $a$ is constant:

$$s = \tfrac{1}{2}at^2$$

$$a = \frac{2s}{t^2}$$

$$PE = may = \frac{2smy}{t^2} \tag{1}$$

$$KE = \tfrac{1}{2}Iw^2 \tag{2}$$

$$w = K_0 at \tag{3}$$

Where $K_0$ is an appropriate constant. Substituting (3) in (2)

$$KE = K_1 a^2 t^2 \tag{4}$$

For a no loss system; i.e. where magnets are omitted so eddy currents are absent:

$$PE = KE \tag{5}$$

Combining (1) and (4)

$$\frac{2smy}{t^2} = K_1 a^2 t^2$$

$$2\,my = K_2 s$$

$y = K_3 s$ or $y$ is a measure of $s$ independent of $a$.

This relationship is represented in FIG. 3 by curve A. In this instance the accelerometer is a true integrator, i.e. it integrates acceleration twice to provide a true measure of distance traveled by the housing. The value of constant $K_0$ and therefore of $K_3$ will, of course, depend on the actual materials and configurations of the accelerometer used.

For a system with eddy current losses $$PE = KE + \text{Loss}$$

$$\frac{2smy}{t^2} = K_1 a^2 t^2 + K_2 a^2 t^3$$

Loss may be expressed as $$\int \frac{E^2 dt}{r} \text{ or } \frac{E^2 t}{r}$$

where:
$E$ = the voltage induced by the motion of the magnetic field.
$r$ = the electrical resistance across which "E" is induced.

The expression $$\frac{E^2 t}{r}$$

is the ohmic energy loss due to the eddy currents caused by E flowing in $r$.

But $$E = K_3 w$$

so $$\text{Loss} = K_4 \int w^2 dt$$

and $$w = Kat$$

so $$\text{Loss} = K_5 \int a^2 t^2 dt = K_6 a^2 t^3$$

$$\frac{2smy}{t^2} = K_1 a^2 t^2 + K_6 a^2 t^3$$

Since $$a = \frac{2s}{t^2}$$

by substitution:

$$\frac{2smy}{t^2} = 4K_1 \frac{s^2 t^2}{t^4} + 4K_6 \frac{s^2 t^3}{t^4}$$

or $$2smy = 4K_1 s^2 + 4K_6 s^2 t$$

$$2my = 4K_1 s + 4K_6 st$$

$$2my = 4s(K_1 + K_6 t)$$

$$y = s(K_7 + K_8 t)$$

where, as in the no loss case, the constants depend on materials and configuration of the accelerometer. For the no loss case, it was seen that $y$ is related to $s$ by constants depending upon the mechanical constants of the design. For the case with eddy current loss, i.e. loss proportional to the square of $w$, $y$ increases at a rate that decreases as $s$ increases. This effect is illustrated in curve B of FIG. 3. In the case with losses it should be noted that by suitably shaping the cylinder, that the term $K_8 t$ in the last equation can be adjusted through fairly wide limits to provide curves lying at various positions below the no loss curve, i.e. curve A of FIG. 3. One example is curve C which can be obtained by providing a cylinder with progressively smaller diameter.

As an alternative construction of the eddy current version of the accelerometer, the disk may be made a conductor and the cylinder a magnet with poles on its inner surface.

The accelerometer described in the case where there are no losses is a true integrator, i.e. it integrates the acceleration twice to provide a true measure of distance, i.e. $y$ is directly proportional to $s$. It is small in size, rugged and easy to make.

The unit described in the case with eddy current losses does not perform only the double integration, and $y$ is not directly proportional to $s$ but that to $s + Kst$. This means that the accelerometer may be so constructed as to require the missile to reach a certain distance within a certain time, i.e. with some minimum duration of acceleration. In addition it is small, rugged and easy to make.

While the invention has been disclosed and described in some detail in the drawings and foregoing description, they are to be considered as illustrative and not restrictive in character, as other modifications may readily suggest themselves to persons skilled in this art and within the broad scope of the invention reference being had to the appended claims.

What is claimed is:

1. An accelerometer comprising: a housing member having a longitudinal axis; a translating member threadedly coupled to said housing member, the threaded coutation about said axis and in translation in said housing member for movement of said translating member in rotation about said axis and in translation in said housing member; magnetic means on one of said members and an electrical conductor in the other of said members, said magnetic means and said conductor being spaced to create a magnetic field in said conductor, whereby acceleration of said housing member in a direction parallel to its longitudinal axis causes said translating member to move in rotation and translation in said housing member through positions in said housing member with respect to a normal initial position of said translating member, which are representative of distance traveled by said housing member in a direction parallel to said longitudinal axis.

2. An accelerometer comprising: a housing member having an inner regular surface with an axis; a circular disk member threadedly coupled to said housing member and coaxial with said axis for movement in rotation and translation in said housing member; magnetic means on one of said members and an electrical conductor in the other of said members, said magnetic means and said conductor being spaced to create a magnetic field in said conductor, whereby acceleration of said housing member in a direction parallel to the axis of its inner surface causes said disk member to move in rotation and translation in said housing member inducing eddy currents in said conductor to oppose said rotation and translation; and means responsive to motion of said disk member to initiate an event upon attainment by said disk member of a position with respect to a normal initial position thereof, which is representative of a distance traveled by said housing in a direction parallel to the axis of said inner surface.

3. An accelerometer comprising: a housing member having an inner regular surface with an axis; a post affixed to said housing and coaxial with said axis; a circular disk member threadedly engaged with said post; magnetic means on one of said members and an electrical conductor in the other of said members, said magnetic means and said conductor being spaced to create a magnetic field in said conductor, whereby acceleration of said housing member in a direction parallel to the axis of its inner surface causes said disk member to move in rotation and translation in said housing member inducing eddy currents in said conductor to oppose said rotation and translation; and means operable by said disk member to initiate an event upon attainment by said disk of a position with respect to a normal initial position thereof, which is representative of the distance traveled by said housing in a direction parallel to the axis of said inner surface.

4. An accelerometer comprising: a housing having an inner cylindrical surface of electrically conductive material; a post affixed to said housing; a carrier threadedly engaged with said post and having a plurality of magnetic poles disposed in close proximity with the inner cylindrical surface of said housing; and means in operable association with and movable by said carrier whereby acceleration of said housing in a direction parallel to the axis of its inner surface causes motion of said carrier and causes said magnetic poles to induce eddy currents to oppose said motion and said carrier moves said means to initiate an event upon attainment by said carrier of a position with respect to a normal initial position thereof, which is representative of the distance traveled by said housing in a direction parallel to said inner surface.

5. An accelerometer comprising: a housing having an inner cylindrical surface of electrically conductive material; a post affixed to said housing and having an external surface coaxial with the inner cylindrical surface of said housing and having means in said external surface advancing in a spiral along said post; a circular disk threadedly engaged with said post through the means in said external surface, said disk having a plurality of magnetic poles in the outer periphery thereof in close proximity with the inner cylindrical surface of said housing; and means in operable association with and movable by said disk; whereby acceleration of said housing in a direction parallel to the axis of its inner surface causes said disk to move in rotation and translation in said housing inducing eddy currents to oppose said motion and said disk moves said means to initiate an event upon attainment by said disk of a position with respect to a normal initial position thereof, which is representative of the distance traveled by said housing in a direction parallel to said inner surface.

6. The accelerometer of claim 5 wherein said means in the external surface is a screw thread of low friction material receiving a matching thread portion of said disk said matching thread portion being of low friction material.

7. An accelerometer comprising: a housing having an inner cylindrical surface of electrically conductive material; a post affixed to said housing and extending inside of said cylindrical surface, said post having an external cylindrical surface coaxial with the inner cylindrical surface of said housing and having a continuous groove in said external surface advancing in a spiral along said post; a circular disk threadedly engaged with said post by means of said groove, said disk having a plurality of magnetic poles in the outer periphery thereof in close proximity with the inner cylindrical surface of said housing; means in operable association with and movable by said disk, whereby acceleration of said housing in a direction parallel to the axis of its inner surface causes said disk to move in rotation and translation in said housing inducing eddy currents to oppose said motion and said disk moves said means to initiate an event upon attainment by said disk of a position with respect to a normal initial position thereof, which is representative of the distance traveled by said housing in a direction parallel to said inner surface.

8. An accelerometer comprising: a housing of electrically conducting material and having an inner cylindrical surface of a length substantially greater than its diameter; a post affixed to said housing and extending inside of said cylindrical surface, said post having an external cylindrical surface coaxial with the inner cylindrical surface of said housing and having a continuous groove in said external surface advancing in a spiral along said post; a circular disk threadedly engaged with said post by means of said groove, said disk having a plurality of magnetic poles in the outer periphery thereof in close proximity with the inner cylindrical surface of said housing; means in operable association with and movable by said disk, whereby acceleration of said housing in a direction parallel to the axis of its inner surface causes said disk to move in rotation and translation in said housing inducing eddy currents to oppose said motion and said disk moves said means to initiate an event upon attainment by said disk of a position with respect to a normal initial position thereof, which is representative of the distance traveled by said housing in a direction parallel to said inner surface.

9. An accelerometer comprising: a housing of electrically conducting material and having an inner cylindrical surface of a length substantially greater than its diameter; a post affixed to said housing and extending inside of said cylindrical surface, said post having an external cylindrical surface coaxial with the inner cylindrical surface of said housing and having a continuous groove in said external surface advancing in a spiral along said post; a circular disk threadedly engaged with said post by means of said groove, said disk having a plurality of magnetic poles in the outer periphery thereof in close proximity with the inner cylindrical surface of said housing; means in the annular space between the housing and the post and movable by said disk, whereby acceleration of said housing in a direction parallel to the axis of its inner surface causes said disk to move in rotation and translation in said housing inducing eddy currents to oppose said motion and said disk moves said means to initiate an event upon attainment by said disk of a position with respect to a normal initial position thereof, which is representative of the distance traveled by said housing in a direction parallel to said inner surface.

10. An accelerometer comprising: a housing of electrically conducting material and having an inner cylindrical surface of a length substantially greater than its diameter; a post affixed to said housing and extending inside of said cylindrical surface, said post having an external cylindrical surface coaxial with the inner cylindrical surface of said housing and having a continuous groove in said external surface advancing in a spiral along said post; a circular disk threadedly engaged with said post by means of said groove, said disk having a plurality of magnetic poles in the outer periphery thereof in close proximity with the inner cylindrical surface of said housing; a shaft extending into the annular space between the housing and the post and parallel to said post and from an end opposite a normal initial position of said disk, said shaft being positionable longitudinally in said space and movable in a position in said space by said disk whereby acceleration of said housing in a direction parallel to the axis of its inner surface causes said disk to move in rotation and translation in said housing inducing eddy currents to oppose said motion and said disk moves said shaft to initiate an event upon attainment by said disk of a position with respect to said normal initial position thereof, which is representative of the distance traveled by said housing in a direction parallel to said inner surface.

11. A accelerometer comprising: a housing of electrically conducting material and having an inner cylindrical surface of a length substantially greater than its diameter; a post affixed to said housing and extending inside of said cylindrical surface, said post having an external cylindrical surface coaxial with the inner cylindrical surface of said housing and having a continuous groove of semicircular cross section in said external surface advancing in a spiral along said post; a circular disk threadedly engaged with said post through a recirculating ball nut affixed to said disk, balls of said nut being movably disposed in said groove, said disk having a plurality of magnetic poles in the outer periphery thereof in close proximity with the inner cylindrical surface of said housing; a shaft extending into the annular space between the housing and the post and from an end opposite a normal initial position of said disk, said shaft being positionable longitudinally in said space and movable in a position in said space by said disk whereby acceleration of said housing in a direction parallel to the axis of its inner surface causes said disk to move in rotation and translation in said housing inducing eddy currents to oppose said motion and said disk moves said shaft to initiate an event upon attainment by said disk of a position with respect to said normal initial position thereof, which is representative of the distance traveled by said housing in a direction parallel to said inner surface.

12. A double integrating accelerometer comprising: a housing of electrically conducting material and having an inner cylindrical surface of a length substantially greater than its diameter; a post affixed to said housing and extending inside of said cylindrical surface the length of said cylindrical surface, said post having an external cylindrical surface coaxial with the inner cylindrical surface of said housing and having a continuous groove of semicircular cross section in said external surface advancing in a spiral from one end of said post toward its other end; a circular disk affixed to a recirculating ball nut threadedly engaged with said post through balls of said nut movably disposed in said groove, said disk having a plurality of magnetic poles in the outer periphery thereof in close proximity with the inner cylindrical surface of said housing; a shaft extending into the annular space between the housing and the post and parallel to said post and from an end opposite a normal initial position of said disk, said shaft being positionable longitudinally in said space and movable in a position in said space by said disk whereby acceleration of said housing in a direction parallel to the axis of its inner surface causes said disk to move in rotation and translation in said housing inducing eddy currents to oppose said motion and said disk moves said shaft to initiate an event upon attainment by said disk of a position with respect to said normal initial position thereof, which is representative of the distance traveled by said housing in a direction parallel to said inner surface.

References Cited in the file of this patent
UNITED STATES PATENTS
2,898,416    Clurman _____ Aug. 4, 1959